United States Patent [19]

de Jong et al.

[11] Patent Number: 4,807,957
[45] Date of Patent: Feb. 28, 1989

[54] CONNECTOR FOR OPTICAL FIBERS

[75] Inventors: Michael de Jong, Conover; Brian DiMarco, Taylorsville, both of N.C.

[73] Assignee: Siecor Corporation, Hickory, N.C.

[21] Appl. No.: 108,760

[22] Filed: Oct. 15, 1987

[51] Int. Cl.⁴ .................................................. G02B 6/38
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 4,140,365 | 2/1979 | Burger et al. | 350/96.20 |
| 4,146,300 | 3/1979 | Kaiser | 350/96.21 |
| 4,198,122 | 4/1980 | Prunier et al. | 350/96.21 |
| 4,205,898 | 6/1980 | Matthews et al. | 350/96.21 |
| 4,279,467 | 7/1981 | Borsuk et al. | 350/96.21 |
| 4,281,892 | 8/1981 | Sitabkhan | 350/96.21 |
| 4,302,072 | 11/1981 | Vucins | 350/96.21 |
| 4,389,091 | 6/1983 | Lidholt et al. | 350/96.20 |
| 4,429,949 | 2/1984 | Cartier | 350/96.21 |
| 4,445,753 | 5/1984 | Collignon | 350/96.21 |
| 4,490,006 | 12/1984 | Lidholt | 350/96.20 |
| 4,553,813 | 11/1985 | McNaughton et al. | 350/96.20 |

FOREIGN PATENT DOCUMENTS 0185413  6/1986  European Pat. Off. ......... 350/96.21
3145226  5/1983  Fed. Rep. of Germany ... 350/96.21

*Primary Examiner*—John D. Lee
*Attorney, Agent, or Firm*—J. David Abernethy

[57] ABSTRACT

A device for use in connecting an optical fiber with another optical fiber or other optical component. The device comprises a housing having a passage therein where chamfered sleeves are placed end to end. Springs urge a plurality of spherical balls radially inward against chamfered conical surfaces of the sleeves, thereby keeping the sleeves in proper alignment.

4 Claims, 3 Drawing Sheets

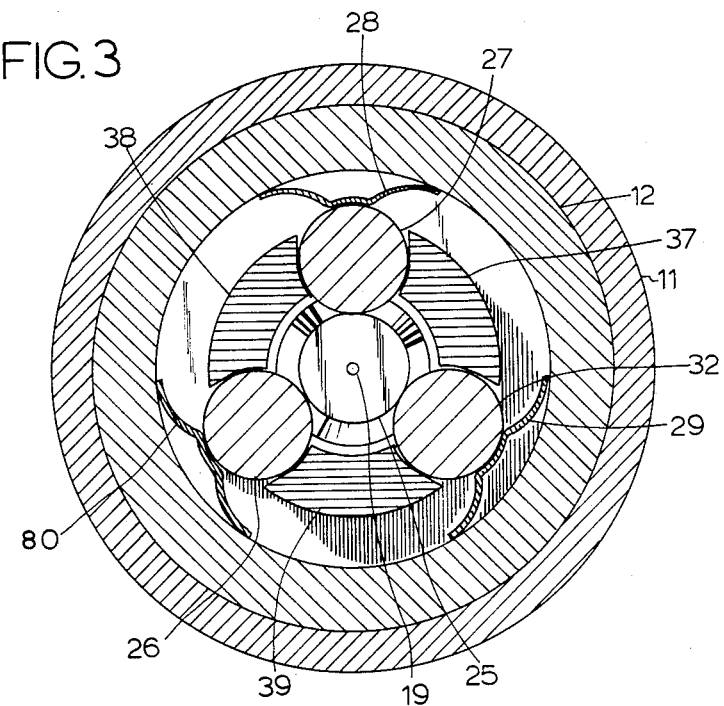
FIG. 3
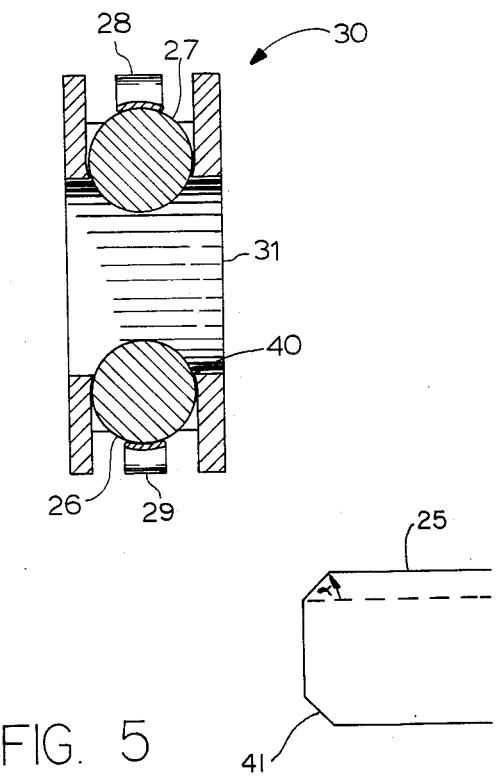
FIG. 4
FIG. 5

CONNECTOR FOR OPTICAL FIBERS

BACKGROUND OF THE INVENTION

1. Field of the Invention

The field of the invention is optical fiber connectors.

2. Background of the Invention

A number of fiber optic connectors have been disclosed in which chamfered sleeves carrying optical fibers are abutted end to end. These connectors generally require very small tolerances of manufacture and of assembly in order that the optical fibers carried by the sleeves be centered precisely with respect to each other. Prunier, U.S. Pat. No., 4,198,122, discloses a connector of this type in which compressible material, such as cord, is placed in spaced apart grooves etched into the outside of each sleeve; the object being that the compressible material would allow self centering of the sleeves. Another U.S. Pat. No., 4,389,091, Lidholt, provides for guiding balls to be placed at the junction point between the chamfered sleeves.

SUMMARY OF THE INVENTION

An object of the invention is to provide a new type of fiber optic connector using chamfered sleeves which do not require exacting tolerances to the full extent required by the prior art, and avoids the use of compressible material around the sleeves which are subject to degeneration after numerous connector rematings. Another object of the invention is to provide a connector which may be remated a number of times without significant degradation of performance.

Therefore, the invention provides for first and second sleeves each having a terminal region provided with a conical outer surface tapering toward a flat end face, the sleeves being placed end to end with said flat end faces in contacting relation; a housing having a recess therein holding the first and second sleeves; at least three balls engaging the conical outer surfaces of the first and second sleeves; and a plurality of first springs in the housing recess, each first spring urging a ball radially inward. In the preferred embodiment, the first springs are leaf springs which urge the balls radially inward, and coil springs urge the first and second sleeves against each other. Under the action of the balls and two sets of springs, the sleeves, and thereby optical fibers carried in the sleeves, are precisely aligned.

The use of the two sets of springs creates a problem, however. The centering action of the balls also tends to push the sleeves apart, while the coil springs tend to push the sleeves together. If the coil springs are too weak, the sleeves may not reach the necessary abutting relationship. However, if the coil springs are too strong, a considerable friction resistance will defeat the purpose of the centering balls engaging the conical outer surfaces of the first and second sleeves. Clearly, the connector must be designed in such a way that transverse centering can occur while longitudinal abutment is achieved. This result will be achieved if the ratio having a numerator equal to the force exerted by a coil spring and a denominator equal to the force exerted by a first spring is equal to $n (\sin \alpha)(\cos \alpha)$, where $n$ is the number of balls and $\alpha$ is the included angle of the conical outer surfaces, and the tangent of the included angle of the conical outer surfaces is less than $\{1 \div [\mu(n-1)]\}$, where $\mu$ is the coefficient of static friction of the flat end faces and $n$ is the number of balls. Thereby, a new and useful connector is achieved. A race contains the balls at predetermined angles in the area of contact between the conical outer surfaces of the first and second sleeves and leaf springs are carried behind each ball, making it possible to allow repeated remating, or disconnection and reconnection of the connector, by the craftsperson.

BRIEF DESCRIPTION OF THE DRAWINGS

FIG. 3 is a sectional view of the connector along lines 3—3 of FIG. 1;

FIG. 4 is an expanded view of the central portion of the connector as shown in FIG. 2; and FIG. 5 describes the included angle of the conical outer surface of a sleeve.

DETAILED DESCRIPTION OF THE PREFERRED EMBODIMENT

Figure 1:
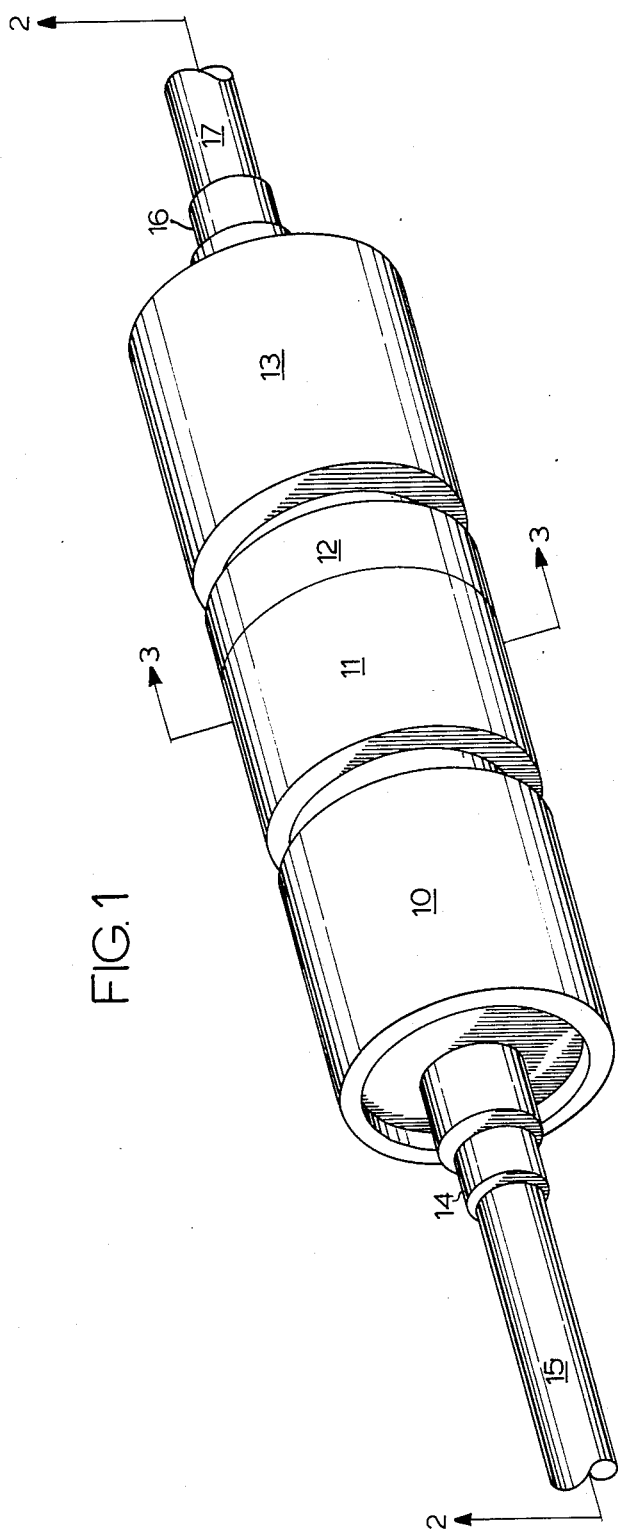
FIG. 1 is a perspective view of the connector.

FIG. 1 shows a perspective view of the connector according to the present invention joining optical fibers contained in buffer tubes 15, 17. Caps 10, 13, fit onto members 11, 12, respectively.

Figure 2:
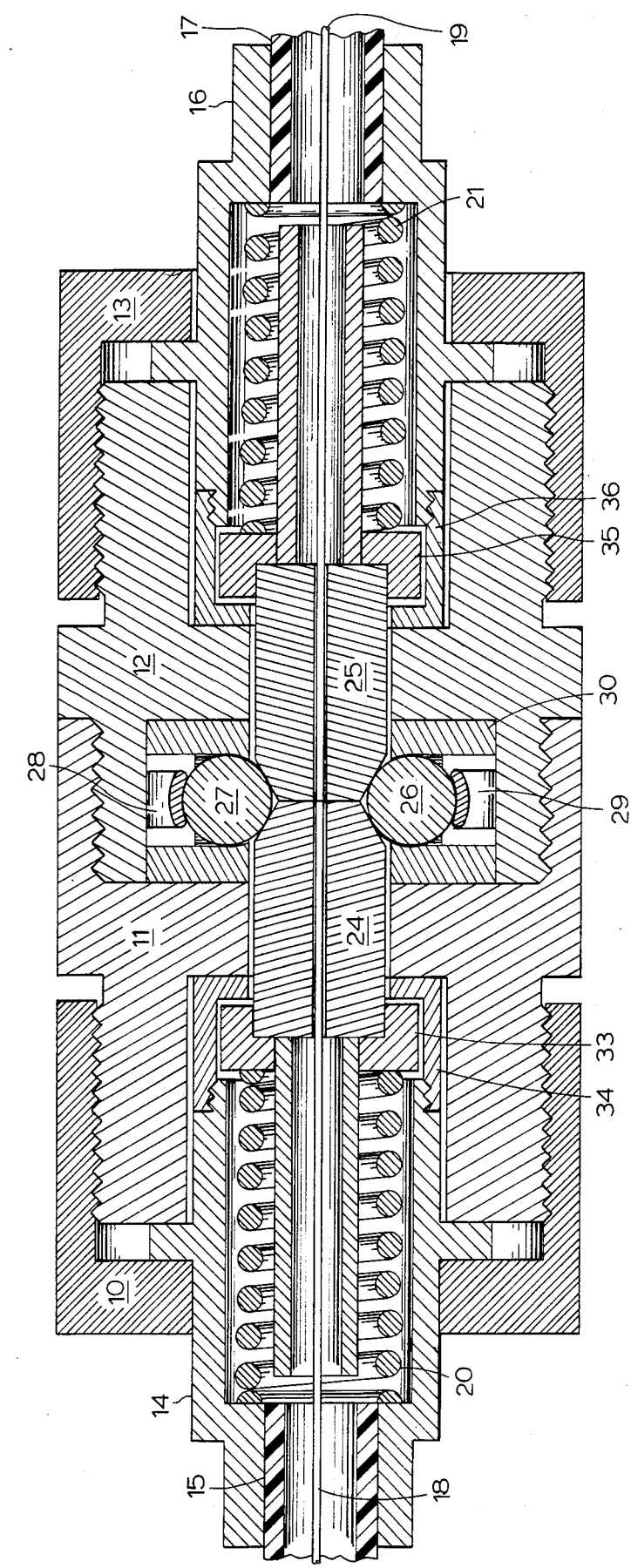
FIG. 2 is a sectional view of the connector along line 2—2 of FIG. 1.

In FIG. 2, optical fibers 18, 19 are shown as properly abutted by sleeves 24, 25, respectively. Sleeves 24, 25 are held in proper lateral position by at least three spherical balls, shown as balls 26, 27. Each spherical ball is held in place by a first spring such as springs 28, 29. These springs are preferably leaf springs placed between the spherical balls and member 12. Sleeves 24, 25 fit in the inner space 31 of reel shaped member 30, as will be more particularly described in FIG. 4.

Blocks 33, 35 fit over the back of sleeves 24, 25, respectively, in order that springs 20, 21 will have a wider surface to exert force upon. It will be seen that springs 20, 21 are coil springs which urge sleeves 24, 25 together so that optical fibers 18, 19 will be in proper abutting position. Spring holding members 14, 16 fit into inner cap members 34, 36 in order to properly hold coil springs 20, 21. Zigzag lines indicate screw threads.

FIG. 3 shows in detail how sleeves 24, 25 are kept in proper lateral alignment. Member 12 is firmly held within member 11, as shown in FIG. 2. Member 12 provides a surface upon which the base of leaf springs 28, 29, 80 may rest. Leaf springs 28, 29, 80 press upon spherical balls 27, 32, 26, respectively. The spherical balls press upon sleeve 25 holding optical fiber 19. The spherical balls 27, 32, 26 are held in proper angular position by separating members 38, 37, 39 of reel shaped member 30.

FIG. 4 shows an expanded view of reel shaped member 30. Reel shaped member 30 has inner space 31, into which sleeves 24, 25 may be slidably and removably placed. When sleeves 24, 25 are inserted in inner space 31, spherical balls 27, 26 will properly align them. Note the inner central portions of the flanges of reel shaped member 30 have curved shoulders 40, which hold the spherical balls in place upon removal of the sleeves.

FIG. 5 shows an outline of sleeve 25 having conical outer surface 41. Angle $\alpha$, defined herein as the included angle of the conical outer surface of the sleeve, is the angle between conical outer surface 41 and the dashed line parallel to the longitudinal axis of the connector.

The embodiment preferred at this time uses glass sleeves having an included angle $\alpha$ of the conical outer surface of 25 degrees in order to ensure that abutment occurs.

What is claimed is:

1. A connector comprising:
   (a) first and second sleeves each having a terminal region provided with a conical outer surface tapering toward a flat end face, the sleeves placed end to end with said flat end faces in contacting relation;
   (b) a housing having a recess therein holding the first and second sleeves;
   (c) at least three balls engaging the conical outer surfaces of the first and second sleeves;
   (d) a plurality of first springs in the housing recess, each first spring urging a ball radially inward; and,
   (e) first and second coil springs urging the first and second sleeves against each other, wherein:
   (i) the ratio having a numerator equal to the force exerted by a coil spring and a denominator equal to the force exerted by a first spring is equal to n $(\sin \alpha)(\cos \alpha)$, where n is the number of balls and $\alpha$ is the included angle of the conical outer surfaces; and
   (ii) the tangent of the included angle of the conical outer surfaces is less than $\{1 \div [\mu (n-1)]\}$, where $\mu$ is the coefficient of static friction of the flat end faces and n is the number of balls.

2. A connector as recited in claim 1, further comprising an optical fiber in each sleeve.

3. A connector as recited in claim 1, wherein the first springs are leaf springs.

4. A connector as recited in claim 3, further comprising an optical fiber in each sleeve.

* * * * *